INVENTOR
E. B. FERRELL
BY
D. MacKenzie
AGENT

Patented Aug. 10, 1954

2,686,271

UNITED STATES PATENT OFFICE 2,686,271

MOTOR CONTROL CIRCUIT

Enoch B. Ferrell, Chatham, N. J., assignor to Bell Telephone Laboratories, Incorporated, New York, N. Y., a corporation of New York Application October 23, 1946, Serial No. 705,027

5 Claims. (Cl. 307—96)

1

This invention relates to an improvement in motor control circuits, especially important when the servomotor is to be supplied with driving voltage from a pair of vibrating relays differentially controlled by the polarity and magnitude of a unidirectional control voltage.

As an example of the application of such a motor control system, there may be mentioned the driving by the controlled motor of a pair of magnetic deflecting coils around the axis of a cathode-ray oscilloscope with the requirement that the angular position of the coils referred to a selected diameter of the cathode-ray screen shall at all times agree with the angular facing of an antenna relative to the heading of the airplane by which the antenna is carried. Here the need for economy of apparatus has led to the replacing of an elaborate amplifier by the simple arrangement of a pair of relays differentially responsive to a control voltage representing in magnitude and polarity (or phase) respectively, the extent and direction of discrepancy between the angular positions concerned, namely, that of the deflecting coils and that of the antenna to be followed.

It is well known to derive an error voltage from a system comprising transmitting synchronous repeaters of which the rotors are positioned in accordance with the object to be followed and similar receiving repeaters in the rotors of which appear voltages other than zero unless the transmitting and receiving rotors are electrically in angular agreement. The voltages in the receiving rotors are made use of, to position the shafts of those rotors, in circuits such as that disclosed by E. M. Hewlett et al. in United States Patent 1,628,463, May 10, 1927, or that shown by H. L. Hull in United States Patent 2,088,654, August 3, 1937. The former of the patents mentioned discloses the use of fine and coarse transmission systems in the control of one object to follow another, while the latter patent describes a system in which is included means for avoiding hunting of the controlled object about the desired position. Both of these features are economically combined in a circuit using the present invention.

Thermionic relays, differentially operated in a sense corresponding to the phase of the pulsating control voltage are shown by A. J. Hornfeck in United States Patent 2,330,427, September 28, 1943. It is likewise known to the art to use electro-mechanical in place of thermionic relays, the mechanical relays being maintained in vibration by an external source of alternating current; this is disclosed by J. T. L. Brown and C. E. Pollard, Jr., in application Serial No. 594,048, filed May 16, 1945, assigned to the same assignee as the present invention. However, the prior art contains no disclosure of a motor control circuit containing electromechanical relays of which the relation of output voltage to input control voltage is made linear through the use of negative feedback.

2

In one embodiment of the present invention the motor which operates to position a following shaft in agreement with a shaft to be followed is controlled by a pair of electromechanical relays, preferably of the mercury contact type, differentially controlled by a thermionic amplifier comprising a plurality of stages, the output circuits of the final stage including the relay driving coils while the input stages are respectively connected to the opposite terminals of a source of direct control voltage which changes magnitude and polarity with the direction and amount of correcting displacement required of the driven motor. In addition, there are provided from the motor terminals to the first amplifying stage two feedback paths furnishing respectively negative feedback to linearize the relay operation and positive feedback to maintain the relays in vibration without recourse to an external source. As a further feature, there is included means for feeding back to the input circuit of the amplifier a voltage representing the time integral or time derivative of the angular velocity of the motor shaft to check the tendency of the motor to hunt.

While the invention is described below with reference to a specific application the reader will recognize that it provides a relay amplifier enabling a motor to follow with precision a varying voltage for any purpose.

The general object of the invention is, therefore, to provide a relay amplifier with a substantially linear input-output characteristic. In particular, another object is to linearize the operation of the relays in such an amplifier by means of negative feedback between the load and the input circuit. By "linearizing" is meant to provide such an operation of the relays as will result in a voltage applied to the load circuit which varies linearly with the varying control voltage over an adequate range of variations thereof. Further, an object is to enable the relays in such an amplifier when responding to a unidirectional voltage to be self-excited through a positive feedback connection from the load to an appropriate stage of amplification preceding the relays.

The invention will be understood from the following description read with reference to the accompanying drawings, in which.

Figure 1:
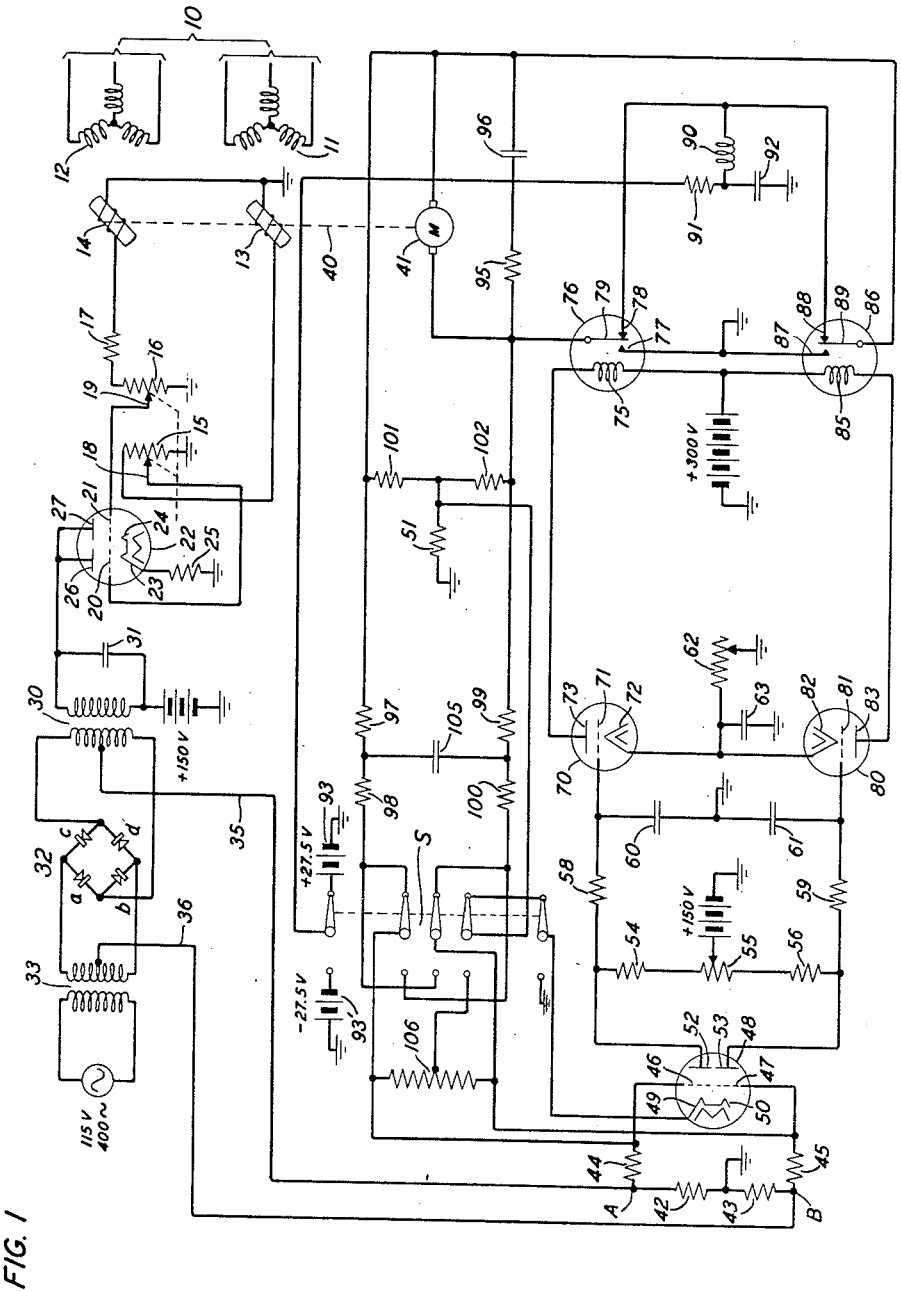
Fig. 1 is a practical circuit using the invention to annul an error voltage representing a shaft displacement to be corrected.

Referring now to Fig. 1, numeral 10 indicates generally the receivers of a synchronous repeater transmission system of conventional design, the transmitters of which (not shown) are understood to be at a distant point. A suitable alternating voltage, say of 400 cycles frequency, is understood to supply the rotor coils of the transmitters, so that a voltage of this frequency appears in the rotor coils of receivers 11 and 12 unless the angular positions of both sets of rotors correspond. Two independent synchronous repeater systems are provided, as taught in United States Patent 1,628,463 above referred to, and the shaft to be followed is geared 1:1 to the rotor supplying receiver 11, 9:1 to that supplying receiver 12, so that as the relative displacement of followed and following shafts varies through 360 degrees, the error voltage in rotor 13 passes through one complete cycle while the similar voltage in rotor 14 passes through nine cycles.

In order that the combined error voltages from the 1:1 and 9:1 rotors shall not pass through zero except when the relative shaft displacement is zero, there is used a smaller fraction of the voltage from the 9:1 rotor than of the voltage from the 1:1 rotor. This is accomplished by the connection to ground of one end of each of rotor coils 13 and 14, the other ends being taken respectively to potentiometers 15 and 16, in the latter case through series resistor 17 of 200 ohms resistance. The resistance of potentiometers 15 and 16 being each 100 ohms, corresponding points of these potentiometers on which rest ganged brushes 18 and 19 are at different voltages above ground, that of brush 18 being three times that of brush 19. Such an arrangement is known to the art. By the combination of the voltages from the fine and coarse repeaters, there is obtained a steeper change of total voltage near the balance point.

Connections are made from brushes 18 and 19 to grids 20 and 21, respectively, of tube 22, suitably a 6J6. Cathodes 23 and 24 of tube 22 are jointly grounded through biasing resistor 25, while anodes 26 and 27 are jointly connected to one terminal of the primary of transformer 30, the other terminal of this primary being connected to +150 volts supplying anode voltage to tube 22. Condenser 31, of 0.02 microfarad capacity is provided to tune the primary of transformer 30.

It is desired to rectify this error voltage and this is done by a circuit intervening between the secondary windings of transformers 30 and 33. To the primary of the latter is supplied a 400-cycle voltage from the same source as supplies the rotor coils of the transmitting selsyns. The intervening circuit includes the bridge 32 comprising four copper oxide rectifiers, connected as shown. Across one diagonal of the bridge is connected the secondary winding of transformer 30, the secondary winding of transformer 33 being connected across the other diagonal of bridge 32. Conductors 35 and 36 are connected to the midpoints of the secondary windings of transformers 30 and 33, respectively. Bridge 32, with transformers 30 and 33 connected as described is a simple modification of a circuit shown by R. S. Caruthers in an article (Bell System Techanical Journal, vol. 18, page 315, April 1939) entitled "Copper oxide modulators in carrier telephone systems," Fig. 2C.

The 400-cycle voltage supplied to the primary winding of transmitter 33 is large compared to the error voltage supplied from tube 22 and therefore controls the resistance of the copper oxide elements of bridge 32. As a result elements $a$ and $b$ will be of low resistance, $c$ and $d$ of high resistance for one half cycle and reversely for the next half cycle of the voltage from transformer 33. This voltage may be called the carrier voltage, that from transformer 30 the signal voltage. Since the arms of bridge 32 are balanced as are also the secondary windings of the two transformers, no carrier potential will appear between conductors 35 and 36. The phase of the voltage in the secondary of transformer 30 depends upon the sense of the error to be corrected, so that when error voltage is present it is either in or out of phase with the carrier voltage.

From an analysis, unnecessary for the description of the present invention, following the article by Caruthers above referred to, it may be shown that between conductors 35 and 36 there appear voltages of frequencies equaling the sum and the difference of the frequencies of carrier and signal voltages. Since these frequencies are each 400 cycles, the result is a unidirectional voltage, undulating at a frequency of 800 cycles and of a polarity and magnitude depending on the phase and amplitude of the signal voltage. It may further be shown that when the signal and carrier voltage are in phase conductor 35 will be positive with respect to conductor 36, negative when the voltages are out of phase. There is, therefore, available between points A and B, to which are connected, respectively, conductors 35 and 36, a unidirectional control voltage with an 800-cycle ripple filtered out in the subsequent circuit.

The movement of rotor coils 13 and 14 is controlled by shaft 40 of motor 41, and this shaft may be provided with mechanical connections (not shown) whereby its angular position may be indicated. For example, the voltages induced in coils 13 and 14 may represent the angular positional disagreement between shaft 40 and a distant shaft controlling the rotors of transmitting repeaters whose stators are individually connected to stators 11 and 12 of the receiving repeaters indicated generally at 10. The pulsating unidirectional voltage between points A and B is enabled, by the circuit now to be described, to control the operation of motor 41 to annul the error voltage in rotor coils 13 and 14.

At points A and B the voltage between conductors 35 and 36 is impressed across resistors 42 and 43 the junction of which is grounded. Through resistors 44 and 45 points A and B are connected respectively to grids 46 and 47 of tube 48 suitably a double triode such as the 6J6. Cathodes 49 and 50 of tube 48 are connected together and to ground through resistor 51. Cathode heating power is understood but not shown for tube 48 and for the tubes later to be identified. Anodes 52 and 53 are supplied with power from a source of +150 volts through resistors 54, 55 and 56, the connection to the source being made at a tap on resistor 55 adjustable to balance the two halves of tube 48.

The two triodes of tube 48 are thus in push-pull with respect to any voltage between points A and B. Tube 48 is succeeded by tubes 70 and 80, each suitably a 6C4. Anode 52 is connected through resistor 58 to grid 71 of tube 70; anode 53 is connected through resistor 59 to grid 81 of tube 80. Shunting grids 71 and 81 to ground are condensers 60 and 61. These condensers with resistors 58 and 59 constitute filters to suppress the 800-cycle ripple, when such exists, and serve another purpose later to be described.

Cathodes 72 and 82 of tubes 70 and 80 are jointly grounded through adjustable resistor 62 and by-pass condenser 63. Anode voltage is supplied from a source of +300 volts to anodes 73 and 83 respectively in series with driving coils 75 and 85 of relays 76 and 86. Relays 76 and 86, while preferably of the mercury contact type, may be relays of any type having driving coils 75, 85 of resistance suitable for the anode paths of tubes 70 and 80, with fixed contacts 77, 78 and 87, 88 and swinging contacts 79, 89. In the absence of operating currents through coils 75, 85 each of swinging contacts 79, 89 is held by a retractile spring, not shown, against the corresponding one of non-operated (back) contacts 78 and 88, which are jointly connected to a source of positive voltage through a filter network consisting of inductance 90, resistance 91 and condenser 92. The positive voltage so connected to contacts 78, 88 is that for which motor 41 is designed. Motor 41 in a particular circuit according to Fig. 1 was a direct current motor with permanent magnet field, and the armature voltage was 27.5 volts.

Swinging contacts 79, 89 are connected individually to the terminals of the armature of motor 41 across which is bridged for contact protection resistor 95 in series with condenser 96.

From the armature terminals of motor 41 two feedback paths are provided to the input stage of the amplifying system including the relays 76, 86. One path is in two branches: one branch from the right-hand terminal of motor 41 to grid 46 comprises resistors 97 and 98 in series; the other branch from the left-hand terminal of motor 41 to grid 47 comprises resistors 99 and 100 in series. The two branches of this path provide negative feedback from the output load to the input circuits of tube 48 there being an odd number (three) of phase reversals between grids 46 and 47 and the terminals of motor 41. The other feedback path provides positive feedback from resistors 101 and 102 in series across the terminals of motor 41 and joined at their junction to resistor 51 and cathodes 49, 50 of tube 48; this serves for self-excitation of relays 76, 86.

It will later be explained how the negative feedback serves to linearize the operation of relays 76, 86 while the vibration of these relays is self-excited by the positive feedback. It is, of course, possible to produce vibration of the relays from an external source of alternating current introduced in known manner into the input circuits of tubes 70, 80.

Between the junction of resistors 97 and 98 and that of resistors 99 and 100 is connected condenser 105, the effect of which is to check the hunting of motor 41 about the position corresponding to zero error voltage in rotor coils 13 and 14.

In the provision of positive and negative feedback, the invention is an improvement of the relay amplifier disclosed and claimed in the copending application of J. T. L. Brown and C. E. Pollard, Jr., filed May 16, 1945, Serial No. 594,048, assigned to the same assignee as the present invention.

In the foregoing description, the amplifier load illustrated is the armature winding of motor 41, but the usefulness of the invention is not limited thereto: the load may be of any type across which the voltage is to be controlled to follow in magnitude that of a control voltage between points A and B. Moreover the polarity of battery 93 below mentioned need not be as shown. Battery 93' may be replaced by battery 93, of reverse polarity, provided switch S is operated as later explained.

Assuming no error voltage between points A and B, swinging contacts 79 and 89 rest against the normally closed contacts 78 and 88 and +27.5 volts is applied from battery 93 through the filter circuit to both terminals of motor 41. Motor 41 therefore remains at rest. Current paths to ground are present from the 27.5 volt source as follows: from the right terminal of motor 41 through resistors 97, 98, 44 and 42 in series; from the left terminal of motor 41 through resistors 99, 100, 45 and 43 in series; and from the motor terminals, through resistors 101 and 102, thence through resistor 51.

With the circuit condition indicated illustratively in Fig. 1, cathodes 49 and 50 as well as grids 46 and 47 are above ground, the cathodes about 4.6 volts, the grids about 2.5 volts. There is then an effective negative bias of 2.1 volts on grids 46 and 47; anode currents in the two triodes of tube 48 are low and consequently the voltages at grids 71 and 81 are high and permit anode currents in tubes 70 and 80, traversing driving windings 75 and 85, sufficiently large to operate relays 76 and 86 and move swinging contacts 79, 89 simultaneously to the corresponding normally open (front) contacts 77, 87 which are both grounded.

This operation of the relays grounds both terminals of motor 41 and with them the grids and cathodes of tube 48. Accordingly, the anode currents of tube 48 increase. The anode voltages fall due to the increased voltage drop in resistors 54 and 56, and the grid voltages of tubes 70 and 80 fall below that of cathodes 72 and 82, the voltage at which has been adjusted, by previous setting of a tap on resistor 62, to such a value that the correct relay operating current flows through coils 75 and 85 when grids 71, 81 are at the higher potential prevailing when the grids of tube 48 are negative to their respective cathodes.

The fall in potential at grids 71 and 81 reduces the anode currents flowing through windings 75 and 85, allowing the relays to release and restore swinging contacts 79, 89 to the normally closed contacts 78, 88 and the cycle of relay operation and release repeats. The relays are thus maintained in vibration, in phase with each other and at a frequency determined by the characteristics of the relays themselves together with the time constants of resistor 58 with condenser 60 and of resistor 59 with condenser 61. In a practical case, this frequency was approximately 100 cycles. Even with an error voltage between points A and B, the positive feedback path through resistors 101, 102 and 51 continues to supply impulses for self-excitation of the relays, the magnitude of these pulses corresponding to the average potential of the motor terminals; these terminals are always at the same potential when no error signal is applied, but of course differ in potential when the motor moves in response to such a signal.

While the relays are vibrating with no error signal applied to the grids of tube 48, they operate and release together, removing from and reapplying to the motor terminals the voltage from the 27.5 volt source at the same time. Voltage impulses, of the same magnitude and of equal duration, are applied to the motor terminals at each release of the relays.

The application of an error signal to grids 46 and 47, positive on one and negative on the other, unbalances the currents in resistors 54 and 56; through resistors 58 and 59, grids 71, 81 are unbalanced and so also the currents in windings 75 and 76. If the currents in windings 75 and 76 have been so adjusted that when balanced the relays are operated and released for equal intervals in each cycle of their vibration, unbalance of these currents will cause the operated interval of one relay to increase and that of the other to decrease; the relay whose operated interval is increased will operate in each cycle earlier and release later than the other relay. The voltage pulses reaching the two motor terminals will be of unequal duration, and in each cycle there will be a net power impulse, positive at the motor terminal receiving the longer impulse. It is understood that the connection to motor 41 is so made that the resulting rotation of shaft 40 shall turn the receiving rotors toward angular agreement with the distance transmitting rotors.

The speed and power of motor 41 is governed by the average power delivered to its terminals, and may be varied smoothly by varying the amount of unbalance in the operating currents in relay windings 75, 85. The relays continue to vibrate as the error signal increases, but at decreasing frequency. When the average voltage applied to the motor terminals reaches approximately 85 per cent of the 27.5 volt supply, one relay becomes fully operated and the other fully released, the full voltage of the 27.5 source is applied to the motor terminal to which is connected the swinging contact of the fully released relay, and the relays cease to vibrate, the fully operated relay being at lock-up. Relay vibration will recommence as soon as the input error voltage is slightly reduced.

The RC circuits comprising, one resistor 58 and condenser 60, the other, resistor 59 and condenser 61, not only contribute to determining the frequency of relay vibration when no error voltage appears between points A and B, but also serve as filter circuits to subdue the 800-cycle ripple on the error voltage when such is present. Such a voltage unbalances the grids of tube 48 and the unbalance is amplified in tube 48 and applied to the grids of tubes 70 and 80. Condensers 60 and 61 tend to charge to the peak level of the undulating error voltage from anodes 52 and 53 and so to present a substantially pure unidirectional voltage on the grids of tubes 70 and 80. These elements, with condenser 105 and the delay time of the relays, are all part of the feedback loop, of which phase and amplitude characteristics are preferably designed as taught by H. W. Bode in United States Patent 2,123,178, July 12, 1938.

If it is desired to use, in the circuit of Fig. 1, battery 93' reversely poled to battery 93, it is necessary to interchange the negative feedback connections to the grids of tube 48 and to reverse in effect the positive feedback connection. This may be done by reversing switch S.

When this switch is operated from the position shown in Fig. 1, battery 93' replaces battery 93, resistor 51 is connected to the mid-point of resistor 106 shunting grids 46 and 47, cathodes 49, 50 are grounded and resistors 98 and 100 are connected respectively to grids 47 and 46. The effect of the switch operation is to reverse the polarity of the feedback voltages to harmonize with the reversed polarity of non-operated contacts 78, 88. In either case, an undue increase in the operated interval of either relay is accompanied by the application to the grid of the tube on the same circuit side as the offending relay, of a voltage of such polarity as to shorten the operated interval. By the positive feedback, in either case a voltage will be introduced into the input circuits of tube 48 of such polarity as to operate the relays from an initially released position.

In practice, of course, one polarity or the other will be chosen for the motor supply voltage and switch S will be omitted.

It will be noted that one component of the differential voltage applied to the grids 46 and 47 is derived from the voltage across the motor, that is, across resistors 101 and 102 in series, and is proportional to that voltage. Another component is proportional to the voltage applied to the feedback amplifier, that is, to the voltage between points A and B. The polarities of these two components are arranged to be normally opposite. If these components are of equal magnitude, that is, if the motor voltage is proportional to the input voltage, then there is no effective signal on the grids 46 and 47 and no differential control drive on the relays. Any small departure from this proportionality causes a small differential voltage to be applied to the grids 46 and 47. This is amplified by tubes 48, 70 and 80 and becomes a large control voltage in the relays, and causes a change in the motor voltage. Polarities are so arranged that this change in motor voltage reduces the error in proportionality. By this means, and because of the large effective amplification in the tubes and relays a very small error in proportionality produces a sufficient corrective action to maintain itself at a very small value, and thus produce a very close approach to linearity. This is the well known linearizing effect of negative feedback such as is described in the article by H. S. Black, "Stabilized feedback amplifiers," Bell System Technical Journal, volume 13, page 1, 1934. Specifically, the operation of the negative feedback, at zero control voltage between points A and B, is as follows:

As will appear in the later discussion of Fig. 2A, it is possible to adjust the point of connection of the +150 volt battery to resistor 55 so that the curve of output voltage (that across the armature of motor 41) passes through zero at zero value of input voltage between points A and B. If there is any difference in the response of relays 76 and 86 to the current changes in windings 75 and 85 or if either response is irregular, it may happen that the differential action of relays 76 and 86 results in a curve of output voltage versus control voltage like the curve labeled "without feedback" in Fig. 2A.

The curve "with feedback" is obtained as the result of negative feedback from the terminals of motor 41 to grids 46 and 47 of tube 48. At no control voltage between A and B relays 76 and 86 operate and release nominally together as above explained. Suppose the operated interval of relay 76 is unduly long. Its swinger 79 is on ground longer than is swinger 89 of relay 86. If the positive voltage source 93 is in use, a net positive voltage pulse appears in each relay cycle at the right terminal of motor 41. This is transmitted via resistors 97 and 98 to grid 46, switch S being thrown right. The conductivity of this half of tube 48 is increased. With this change the voltage of anode 52 is lowered and with it the conductivity of tube 70. The consequent decrease of current in winding 75 shortens the time swinger 79 is in the operated position. The effect is to make zero the voltage across the motor armature when that between A and B is zero.

Figure 2A:
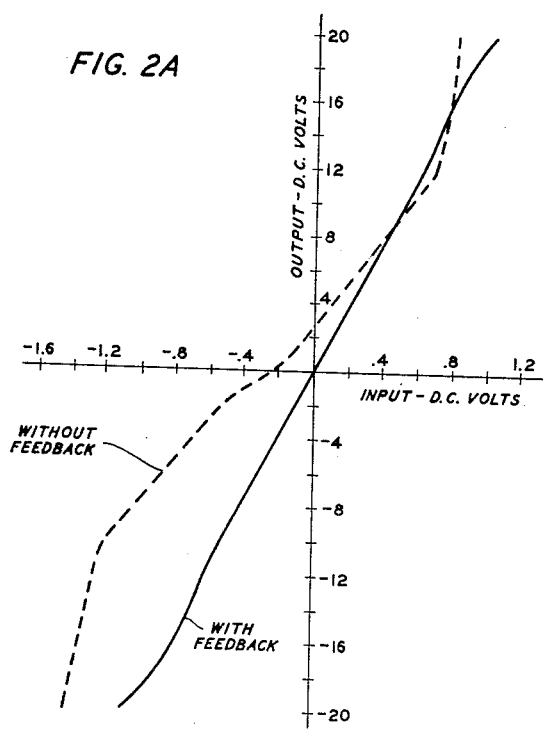
Fig. 2A shows curves comparing the performances of a separately excited relay amplifier with and without negative feedback.

As already stated, adjusting the point of connection of +150 volts to resistor 55 can be made to cause either curve shown in Fig. 2A to pass through the origin. This overcomes an inherent difference in sensitivity of the relays as they respond to the positive feedback which maintains them in operation.

Continuing with the relays both released, switch S thrown right and no control voltage, battery 93 supplies positive potential to contacts 78, 88 and so to both terminals of motor 41. These terminals are shunted by resistors 101 and 102 in series, the junction of which is connected to ground through resistor 51. The voltage to ground of the junction of resistors 101 and 102 is therefore positive and is applied to joined cathodes 49 and 50. This is equivalent to a negative voltage on grids 46 and 47. The effect is to make conductive tubes 70 and 80 and to supply current to operate the relays.

When switch S is thrown left to use negative battery 93', the negative feedback from motor terminals to grids 46 and 47 through resistors 97—98 and 99—100 again overcomes inequalities of relay operation, but the grids are interchanged, with respect to the motor terminals, from their connection with switch S thrown right. Here analysis will show that an unduly long operated interval of relay 76 results in a net positive voltage at the left motor terminal transmitted to grid 46, again producing a decrease in the operate time of relay 76.

The voltage to ground at the junction of resistors 101—102 with no control voltage between A and B is now negative and is applied to the mid-point of resistor 106 and thereby simultaneously to grids 46 and 47. The relay operation is maintained as before. The feedback from resistor 51 is positive since in each case there is produced a positive change in current in the relay windings on the release of the relays.

The feedback through resistors 97—98 and 99—100 is negative since in each position of switch S the voltage across the motor terminals is reduced in value. The analysis stated refers explicitly only to the effect on the relay of longer operated interval, namely to decrease that interval. It will be obvious that applying a like analysis to the other relay (operated interval unduly short) shows that that relay acquires a longer operated interval. From the point of view of the motor terminals with the operate time of one relay greater than that of the other, there is a voltage difference between the terminals which is in one or the other direction depending on the position of switch S and this difference is canceled by the feedback operation.

When, because of an applied error voltage, the motor terminals are at different potentials, the negative feedback paths from motor terminals to the grids of tube 48 apply different feedback voltages to their grids in a sense opposing the error voltage, thereby reducing the gain of the amplifier and providing stabilization of the relays. It will be recognized that the negative feedback above described controls, not the wave shape of each cycle of relay operation, but the envelope of the net power pulses delivered to the terminals of motor 41 so that this envelope shall smoothly follow the variation of the control voltage to which the relays respond.

Without condenser 105, shunting the two negative feedback paths, there would be danger of hunting of motor 41 about the position corresponding to zero error voltage. Motor 41 would, because of its inertia, coast past this position until a reverse error voltage brought it back. As long as there is a constant voltage between the motor terminals, the charge on condenser 105 is constant and has no effect on the feedback paths. If the terminal voltage changes, the charge on condenser 105 must have time to change correspondingly before the change in terminal voltage can affect, through the feedback paths, the potentials of the grids of tube 48. Momentarily, the negative feedback is effectively short-circuited and the full gain of the amplifier is available to check the motor rotation which has, by over-shooting the zero position, given rise to a small error voltage opposing the overshooting. Now, as the motor returns, the reverse error voltage is reduced and condenser 105 discharges to the grids of tube 48, neutralizing the decreasing error voltage and removing the driving power to the motor, which then smoothly comes to the zero position. It is found in practice that the local and distant rotor shafts are maintained in angular agreement within a quarter of a degree.

Such a condenser is an integrator in the feedback path and therefore the equivalent of a differentiator in the input path to the grid of tube 48, and in effect provides to the input a voltage proportional to the time derivative of the voltage, and so to the speed, of motor 41. This time derivative of motor speed is, of course, the second derivative of the position of shaft 40, or the acceleration of that shaft. Its usefulness in checking hunting is explained in United States Patent 2,088,654 to H. L. Hull, previously mentioned; the specific mode of providing this time derivative shown in Fig. 1 is disclosed and claimed in United States Patent 2,412,227 to H. G. Och and K. D. Swartzel, Jr., granted October 12, 1946.

Referring now to Fig. 2A, the dotted curve depicts the input-output characteristic of a relay amplifier with an external source to maintain relay vibration and without feedback. A careful balancing of the circuit, as by adjusting on resistor 55 the point of connection to the +150 volt source, enables the characteristic to be shifted to pass through the zero of both input and output volts. This adjustment is assumed made in the case when negative feedback, as above described, is introduced, resulting in the full line curve of Fig. 2A. The output limit of each curve is the lock-up of the relays.

Figure 2B:
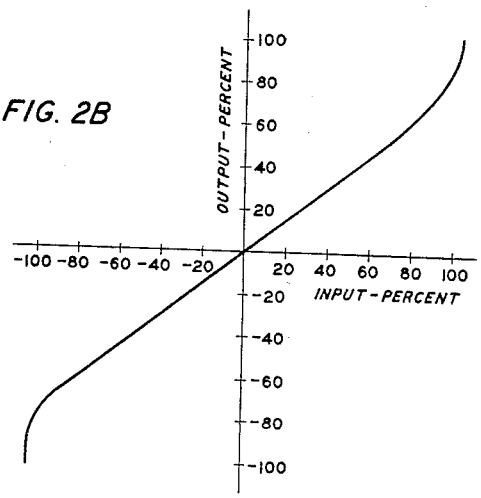
Fig. 2B shows the input-output characteristic of a self-excited relay amplifier with negative feedback.

In Fig. 2B, the single curve exhibits the performance of a relay amplifier such as shown in Fig. 1. Here the input and output voltages are stated in per cent of their values at the point of lock-up, and the required zero balancing adjustment is assumed made. As earlier stated, at about 85 per cent of full output power one relay becomes fully operated while the other is fully released. The curvature at the two ends of this characteristic is opposite to that of the full line curve of Fig. 2A and is due to interaction at high values of output between the positive and the negative feedback paths. Despite this curvature near lock-up, the linearity is adequate for the practical purpose and the freedom from using an external source to vibrate the relays is a significant advantage.

It is obvious that the invention set forth in the foregoing description provides a relay amplifier in a motor control circuit for driving the motor shaft in linear conformity with an input voltage, of which the error voltage in the system particularly described is only one example. The unidirectional input voltage between A and B of Fig. 1 may be replaced by an alternating voltage, in which case the relay vibration is preferably maintained from an external source, retaining the negative feedback which linearizes the amplifier.

What is claimed is:

1. A direct current amplifier for controlling the current in a load circuit in accordance with a unidirectional control voltage comprising a first amplifying stage including a first and a second thermionic vacuum tube having each at least a cathode, a control grid and an anode, the control voltage being impressed between the control grids of said first and second tubes, power supply for said first stage, a second amplifying stage including a third and a fourth thermionic vacuum tube having each at least a cathode, a control grid and an anode, filter networks connecting individually the anode of the first tube to the grid of the third tube and the anode of the second tube to the grid of the fourth tube, power supply for said second stage, a joint connection to ground of the cathodes of the tubes of the first stage and a like connection of the cathodes of the tubes of the second stage, a third amplifying stage including a first and a second electromechanical relay having each a driving winding, a front and a back fixed contact and a swinging contact operable between said fixed contacts, the windings of the first and of the second relay being individually in series between the second-named power supply and the anodes of the third and of the fourth tube, a source of unidirectional voltage connected in one polarity to the back contacts in common and in the opposite polarity to the front contacts in common, negative feedback paths including resistance between the swinging contact of the first relay and the grid of the second tube and between the swinging contact of the second relay and the grid of the first tube and a positive feedback path from the swinging contacts in common and the cathodes of the first stage.

2. An amplifying system for controlling the current in a load circuit in accordance with a control voltage comprising a plurality of stages of amplification providing an odd plurality of phase reversals, the first such stage including a pair of thermionic vacuum tubes each having at least a cathode and a control grid, means for impressing the control voltage across said grids, and the last such stage including a pair of electromechanical relays to which the load circuit is coupled, circuit means for providing a first feedback voltage from the load circuit to said grids and circuit means for providing a second feedback voltage from the load circuit to said cathodes.

3. An amplifying system for controlling the current in a load circuit in accordance with a control voltage comprising a plurality of stages of amplification providing an odd plurality of phase reversals, the last of said stages including a pair of electromechanical relays to which the load circuit is coupled, circuit means for providing a negative feedback voltage from the load circuit to the first of said stages for linearizing the operation of the relays and circuit means for providing a positive feedback voltage from the load circuit to said first stage for maintaining the relays in vibration, the control voltage being coupled to said first stage.

4. An amplifying system for controlling the current in a load circuit in accordance with a control voltage comprising a plurality of stages of amplification providing an odd number of phase reversals, the last of said stages including a pair of electromechanical relays having armatures to which the terminals of the load circuit are individually connected, each other of said stages including in push-pull connection a pair of vacuum tubes each having at least a cathode, a control grid and an anode, and circuit means providing negative feedback voltage from the terminals of the load circuit to the control grids of the first stage, the control voltage being applied between the first stage control grids.

5. An amplifying system for controlling the current in a load circuit in accordance with a control voltage comprising a plurality of stages of amplification providing an odd plurality of phase reversals, the last of said stages including a pair of electromechanical relays to which the load circuit is coupled, and circuit means for providing a positive feedback voltage from the load circuit to the first of said stages for maintaining the relays in vibration, the control voltage being coupled to said first stage.

References Cited in the file of this patent

UNITED STATES PATENTS

| Number | Name | Date |
|---|---|---|
| 1,422,120 | Meyer | July 11, 1922 |